United States Patent [19]
Raio et al.

[11] 3,984,960
[45] Oct. 12, 1976

[54] UTILITY BUILDING SYSTEM

[75] Inventors: Eugene L. Raio, Rancho Palos Verdes; Andrew P. Kennedy, Irvine, both of Calif.

[73] Assignee: Stearns Product Development Corporation, South Gate, Calif.

[22] Filed: Mar. 3, 1975

[21] Appl. No.: 554,558

[52] U.S. Cl. ................................ 52/582; 52/760; 24/73 C; 24/81 C
[51] Int. Cl.² .................... F16B 2/24; E04B 1/40
[58] Field of Search ............ 52/582, 584, 585, 760, 52/463; 24/73 C, 81 C

[56] References Cited
UNITED STATES PATENTS

| | | | |
|---|---|---|---|
| 1,252,781 | 1/1918 | Clark | 403/297 |
| 1,635,147 | 7/1927 | Bloss | 52/760 |
| 2,661,515 | 12/1953 | Nelsson | 52/760 |
| 2,945,329 | 7/1960 | Schneller | 52/712 |
| 2,957,671 | 10/1960 | Messier | 248/223 |
| 3,817,688 | 6/1974 | Shadley | 248/73 |
| 3,871,608 | 3/1975 | Ogden | 248/223 |

*Primary Examiner*—Price C. Faw, Jr.
*Assistant Examiner*—William Randolph
*Attorney, Agent, or Firm*—Blakely, Sokoloff, Taylor & Zafman

[57] ABSTRACT

A plurality of modular panels are joined together by easily installed fasteners to provide an enclosure, or the like. The fasteners pass through ribs of abutting modular panels and are retained in place, in part, by an elongated bead defined by the ribs. Each fastener applies pressure to adjacent ribs at three spaced-apart regions, unlike prior art fasteners which act at a single point.

7 Claims, 13 Drawing Figures

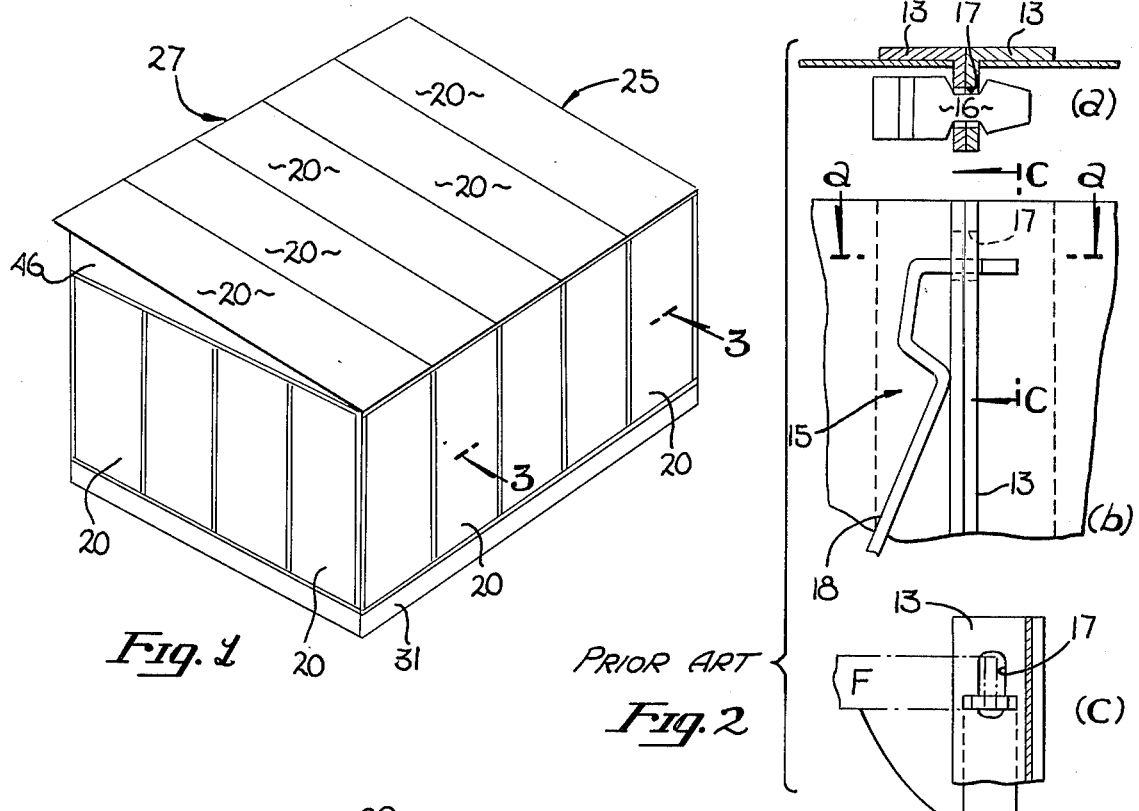
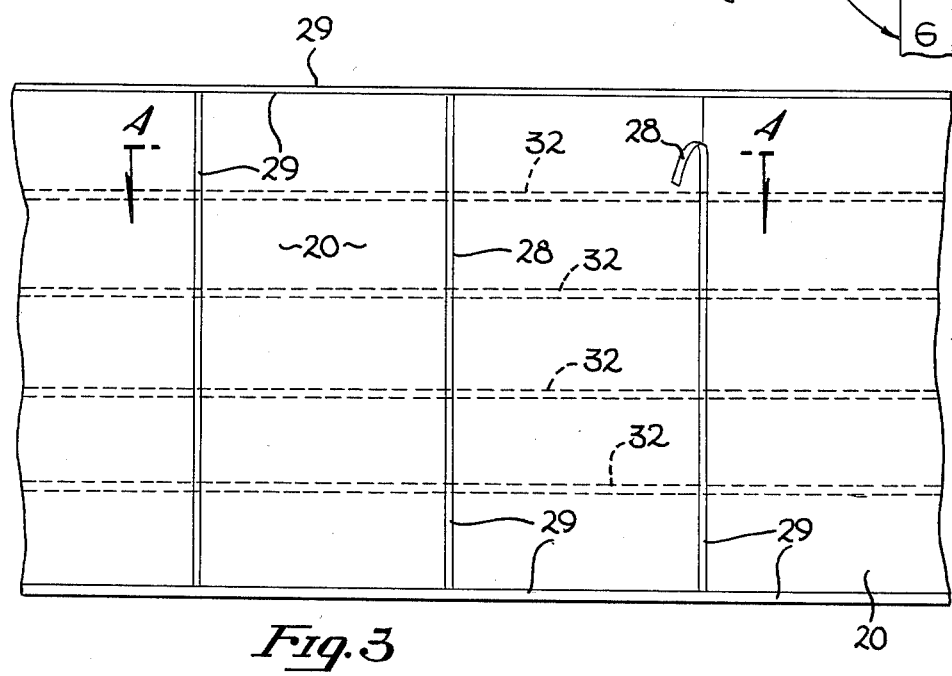
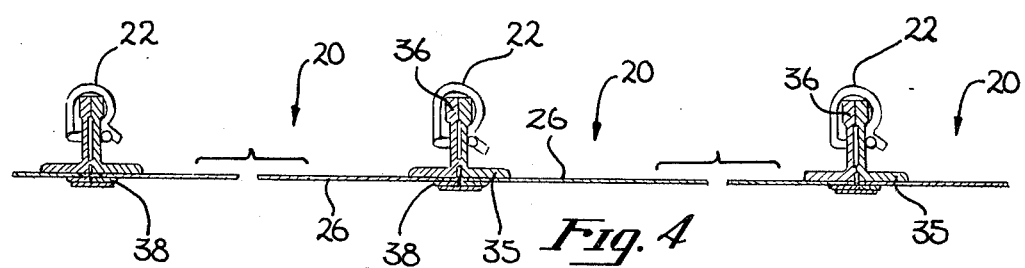

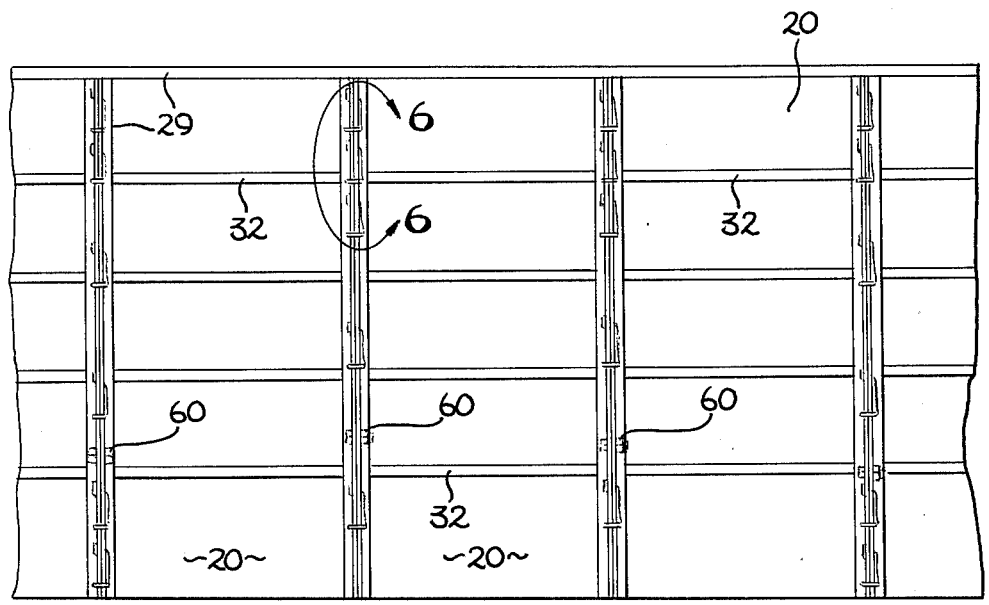
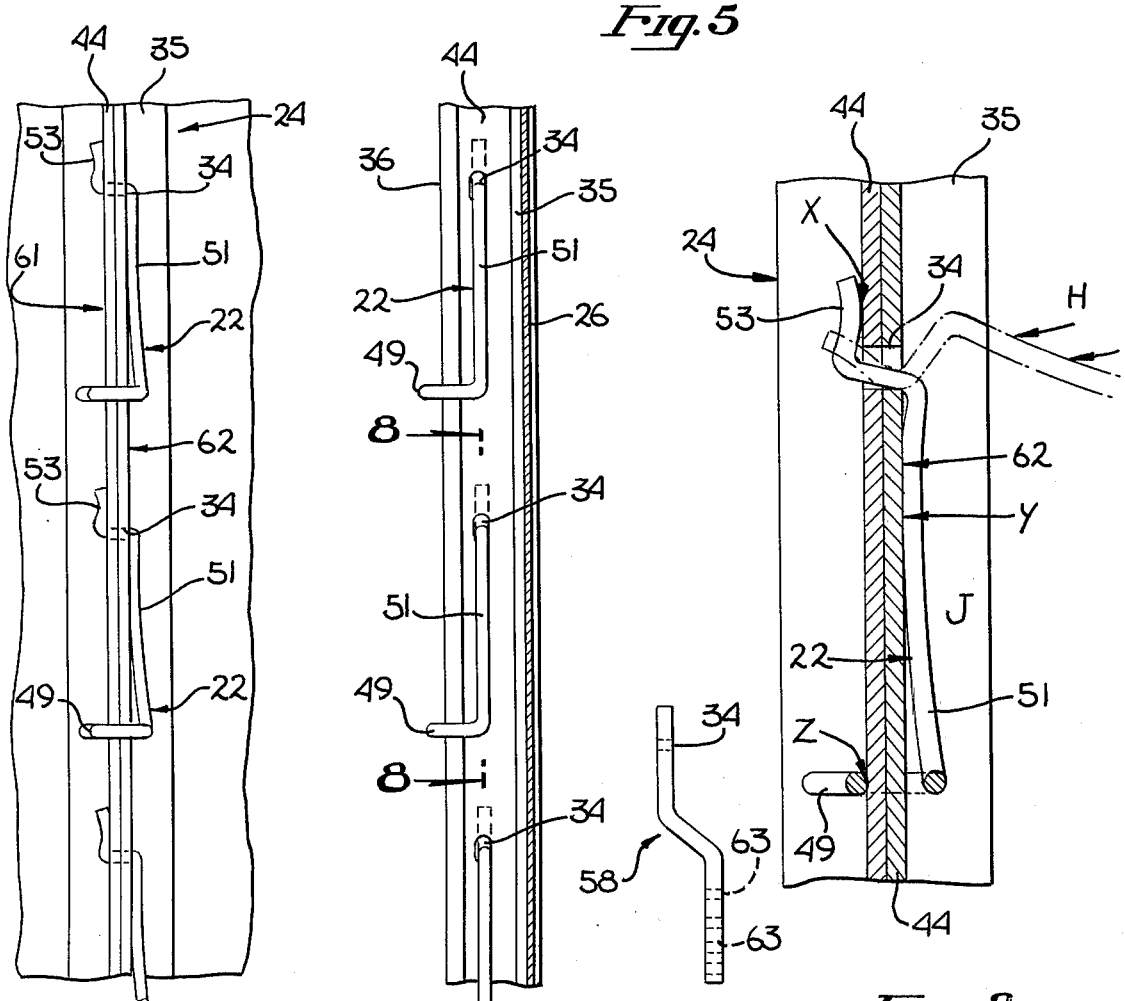

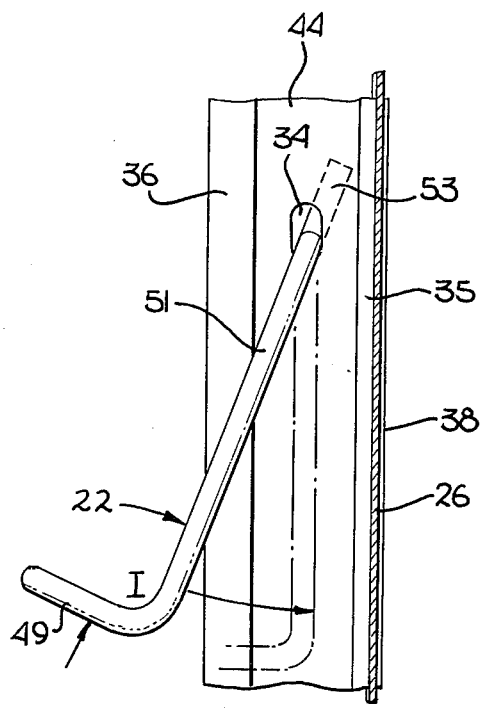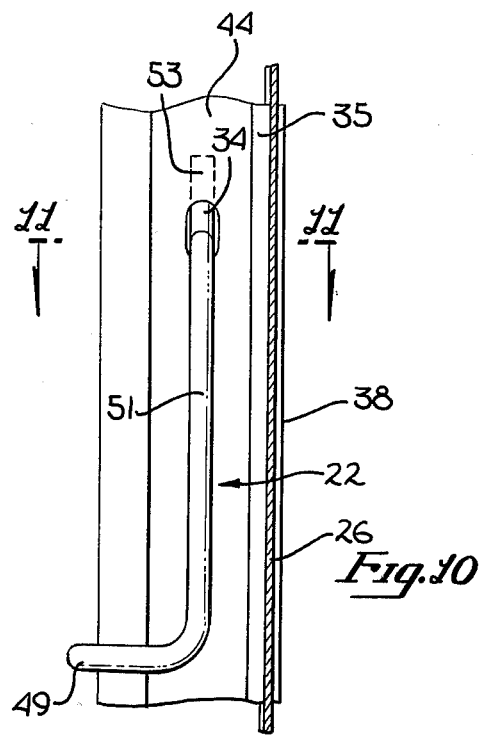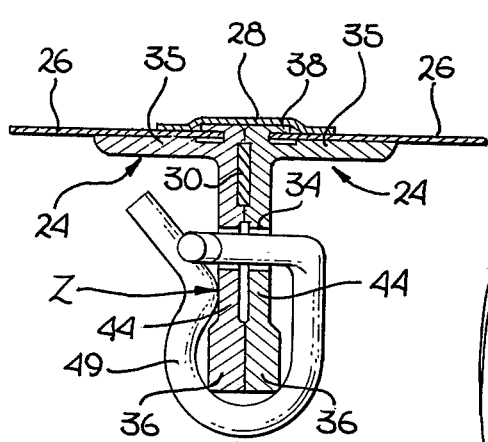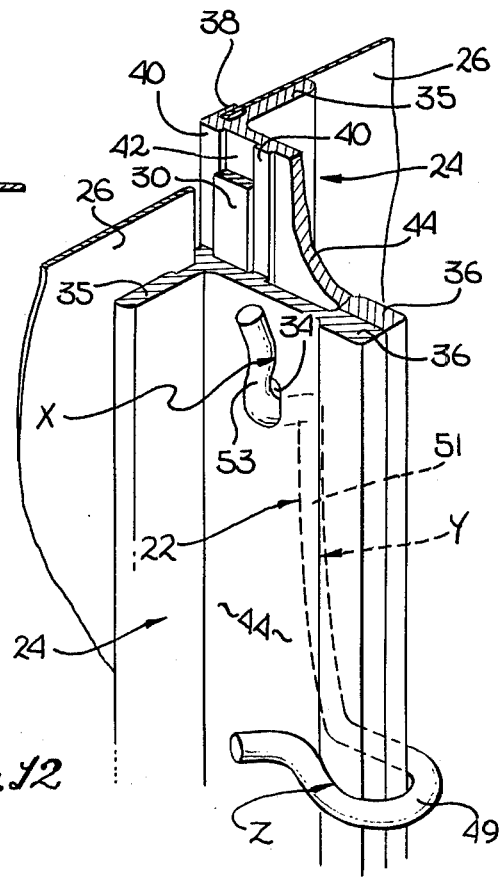

UTILITY BUILDING SYSTEM

BACKGROUND OF THE INVENTION

1. Field of the Invention

The invention relates to the field of modular building panels such as are used in temporary or light duty shelters, or the like.

2. Prior Art.

Numerous industries, and in particular in the construction industry, require temporary modular enclosures or light-duty buildings. Such enclosures are used, for example, for temporarily enclosing a building prior to the installation of the building's permanent facade, to allow continued construction during inclement or undesirable weather. Other requirements for such other enclosures include power plant enclosures, warehousing and fabrication buildings and tool sheds.

Ideally such enclosures should be lightweight, in order that they may be readily handled and erected, durable, re-usable and easily assembled. Moreover, for many applications the resultant structure should be weather-proof, and particularly resistant to sun, wind, rain and other adverse weather conditions.

One prior art enclosure system is shown in U.S. Pat. No. 3,555,754. Among the problems with this system is that the corrugated panel skin cannot readily be sealed to the panel frame because the skin does not provide a smooth surface, but rather a continuously curved surface (see FIGS. 13 and 15). Another significant problem with the system disclosed in this patent is that the fasteners and frame become worn after repeated use, and then are unable to provide proper support.

Another prior art fastener is shown in FIGS. 2a, 2b and 2c and the problems associated with this fastener will be described in conjunction with FIG. 2.

As will be seen, the present invention provides a utility building system which includes a light-weight modular panel, the frame of which is sealed to the panel skin. Furthermore, adjacent panels are held together by a fastener which, although easily installed, does not wear after repeated use. Moreover, the fastener does not include unsafe protruding parts as in some prior art fasteners.

SUMMARY OF THE INVENTION

A utility building system is disclosed which employs a plurality of modular panels in the fabrication of an enclosure, building or the like. Each modular panel includes a generally rectangular frame formed from an L-shaped member. The L-shaped member includes a flange having an adjacent lip; the panel skin rests upon the flange and is secured against the flange by the lip. A rib disposed transversely to the plane of the flange includes an elongated bead defining the free end of the rib. Fastener slots are disposed through the ribs such that when adjacent panels are abutted (during installation) the fastener slots on continuous ribs are in alignment. An elongated irregularly shaped metal fastener is disposed through the slots of adjacent ribs thereby holding adjacent panels together. The fastener includes a first offset end for engaging the exposed surface of one rib, and a generally elongated connecting arm disposed between the offset end and the other end or keeper end of the fastener. The U-shaped keeper end of the fastener is driven over the beads of adjacent ribs thereby straddling the adjacent ribs when the fastener is installed. The connecting arm of the fasteners is then in contact with the exterior surface of the other rib. A gasket is disposed between the abutting surfaces of the ribs and is compressed as the fastener is installed thereby providing a relatively weather-tight seal between adjacent modular panels.

As will be seen, the present invention provides a light-weight utility building system wherein the modular panels are readily re-usable and where the fasteners remain securely in place despite repeated use.

BRIEF DESCRIPTION OF THE DRAWINGS

FIG. 1 is a perspective view of a building fabricated utilizing a plurality of modular panels built in accordance with the present invention.

FIGS. 2a, 2b and 2c are used to illustrate a prior art fastening means. Specifically, FIG. 2a is a cutaway plan view illustrating adjacent panels and fastening means taken through section lines a—a of FIG. 2b. FIG. 2b is an elevation view of the prior art panels and fastening means of FIG. 2a, and FIG. 2c is a side view of the panels and fastening means of FIGS. 2a and 2b taken through section line c—c of FIG. 2b.

FIG. 3 is an elevation view illustrating a plurality of adjacent panels built in accordance with the present invention and used in the building of FIG. 1, taken through section line 3—3 of FIG. 1.

FIG. 4 is a cross-sectional plan view of the invented modular panels and fasteners of FIG. 3 taken through section line 4—4 of FIG. 3.

FIG. 5 is an elevation view illustrating a plurality of modular panels built in accordance with the present invention as viewed from the interior of the building of FIG. 1.

FIG. 6 is a partial exploded view of two adjacent panels of FIG. 5 taken through section line 6—6 of FIG. 5.

FIG. 7 is a side view of the partial panels and fasteners illustrated in FIG. 6.

FIG. 8 is a partial view of a single fastener engaging adjacent modular panels as seen from section line 8—8 of FIG. 7.

FIG. 9 is a side view of a single fastener built in accordance with the present invention, engaging a modular panel prior to the complete installation of the fastener.

FIG. 10 illustrates the fastener of FIG. 9 after the fastener is fully engaged.

FIG. 11 is a plan cross-sectional view of the fastener of FIG. 10 taken through section line 11—11 of FIG. 10.

FIG. 12 is a cutaway perspective view illustrating the fastener engaging adjacent modular panels.

FIG. 13 is a plan view of a support strap.

DETAILED DESCRIPTION OF THE INVENTION

Before examining the present invention in detail, a brief explanation and examination of the prior art fastening means shown in FIGS. 2a, 2b and 2c will be made. In FIGS. 2a and 2b a pair of adjacent panels are illustrated with their corresponding frames 13 in abutment. Each of the frames 13 includes a generally angled member having aligned slots 17. A fastener 15 which includes a slotted head 16, and handle 18 is placed within the slot 17 when the handle is in position F as illustrated in FIG. 2c. The handle 18 is then moved to position G as illustrated in FIG. 2c thereby causing the adjacent frames 13 to be held within the slotted head of the fastener.

The major problem with the prior art fastener 15 is that the notched head 16 and slot 17 wear quickly after repeated use, and then the fastener 15 does not snugly secure the adjacent panels, but rather loosely hangs from the slots. In order for the fastener of FIG. 2 to function properly the dimensions of the slots 17 and notched head 16 must be carefully controlled and maintained. Moreover, the handle 18 of fastener 15 presents a safety hazard since it protrudes from the face of the frame 13.

Referring to FIG. 1, a building 25 is illustrated which is fabricated from a plurality of modular panels 20 built in accordance with the present invention. The building includes a pitched roof 27 and filler panels 46. The building may be fabricated on any one of numerous known foundations, footings or the like, such as cinder blocks or a sill 31 as illustrated in FIG. 1. The entire building 29 may be bolted or otherwise fastened to the sill 31 by known means such as with lag bolts. A floor may be used with the building where required and constructed from common materials; in the presently preferred embodiment the disclosed panels 20 are primarily used as vertical members, or roof members or some combination thereof, such as an A-frame structure.

In the presently preferred embodiment all the modular panels 20 are fabricated in a limited number of sizes, such as 4 ft. by 8 ft. or 4 ft. by 12 ft. It will be apparent that any size modular panel may be fabricated, or that a building or enclosure may be constructed from a plurality of different size panels, however, there are apparent fabrication advantages to having a limited number of different panel sizes. It will also be apparent to one skilled in the art that in some structures support members other than the panels 20 may be required, for example, in a roof where spans are greater than a single panel, some additional structure may be utilized. This additional structure may be fabricated utilizing known technology and commercially available materials.

First, a detailed examination of the construction of a panel 20 will be made followed by a discussion of the presently preferred fastening means (fasteners 22) used to fasten one panel 20 to another and which also may be used to fasten a panel to a sill or other structural member adaptable for receiving the fastener. A plurality of the generally rectangular modular panels 20 are illustrated in FIGS. 3, 4 and 5. Each panel includes a generally rectangular frame 29 defining the sides and end of the panels and a plurality of parallel cross braces 32 disposed between the sides of the modular panels 20.

The frame members which may best be seen in FIG. 12 comprise an elongated L-shaped extruded aluminum member 24. This L-shaped member may be utilized both on the sides of the frame 29, and also on the edges of the frame 29. However, where the edges of the panel are to be fastened with fastening means other than the fasteners 22 other frame members may be utilized. The L-shaped member 24 includes a flange 35 disposed at approximately a right angle to a rib 44. The rib 44 defines a pair of elongated ridges 40 which extend along one face of the rib 44, these ridges define a channel 42 which receives a gasket 30. The free end of the rib 44 defines a bead 36 and as will be seen, this bead 36 is used to secure the U-shaped keeper end 49 of fastener 22 in place. This bead, since it is at the free end of the rib, greatly aids in strengthening the entire frame. An elongated lip 38 (see FIGS. 4, 11 and 12) is disposed along the length of the skin receiving surface of flange 35. During fabrication the generally rectangular skin 26 of the panels is inserted between one face of the flange 35 and the lip 38. The lip 38 is then urged or pressed against the skin 26 securing the skin 26 to the frame.

In the presently preferred embodiment the skin 26 comprises aluminum although other material including transparent or translucent materials may be utilized. Moreover, while an extruded aluminum frame is used, it would be apparent that other materials such as steel may be used. Also in the present fabrication the frame members and cross braces are welded, although rivets or the like may be used. In the presently preferred embodiment the flange 35 is somewhat thicker than the rib 44.

a plurality of slots 34 are disposed through each of the ribs 44 in order that the fastener 22 may be passed between abutting ribs. These slots may be disposed at equal distances along the lengths of the frame 19 in a manner that will assure that when the panels are placed side by side or end to end, the fastener slots 34 are in alignment. It has been found convenient to place the slots at intervals of a few inches longer than the length of a fastener 22. While a fastener need not engage each of the slots, it is convenient to have additional slots available in the event additional fasteners are required. Such additional fasteners may be used to obtain a more positive seal between panels or to obtain more structural strength.

Other apertures may be disposed through the ribs 44; for example, for certain installations it has been found desirable to align adjacent panels with a bolt prior to the installation of the fasteners 22. In FIG. 5 bolts 60 are illustrated disposed through adjacent ribs of panels 20.

The fasteners 22 most clearly seen in FIGS. 6 through 12, in the presently preferred embodiment are fabricated from a continuous steel rod or rigid wire by bending the rod or wire into the desired shape. The fastener 22 includes an offset end 53, a generally elongated center or connecting arm 51 and a U-shaped keeper end 49 disposed at the end of the arm 51 opposite the offset end 53. The offset end 53 is generally parallel to the arm 51 but offset from the arm 51. The offset distance most clearly illustrated in FIGS. 6 and 8 is sufficient to allow end 53 to press against the surface 61 of one rib 44 while the arm 51 applies a force in the opposite direction to surface 62 of an adjacent rib 44 (see FIG. 6). The end 53 includes a curve or bow away from surface 61 such that end 53 contacts surface 61 at less than its entire length, this contact region is identified as contact region X in FIGS. 8 and 12.

The arm 51 of the fastener 22 is generally curved or bowed in the same plane that includes the offset end 53, this curve or bow is away from surface 62. Thus, when the fastener 22 is secured as shown by position J of FIG. 8, the arm contacts surface 62 at a distance less than its entire length, and at a contact region Y shown in FIGS. 8 and 12.

The U-shaped keeper end 49 defines a generally U-shaped end in a plane generally transverse to the plane which includes end 53 and arm 51. The distance of the opening at the opened end of end 49 is slightly smaller than the width of two beads 36 such that when the fastener 22 is installed it may not readily be removed from the ribs 44. The free end of end 49 is curved to define a contact region for engaging the rib. This contact region is shown as region Z in FIGS. 8, 11 and 12.

In order to erect an enclosure which includes the modular panels 20, the panels are disposed side by side, end to end, or in some other configuration where the fastener slots 34 of abutting ribs are in alignment. Any desired shape enclosure may be fabricated such as the building 25 (FIG. 1), A-frame structure, or an enclosure on the frame of a building under construction. A bolt such as bolts 60 shown in FIG. 5 may be used to align the slots 37, or a tapered or drift pin may be temporarily inserted through apertures disposed through adjacent ribs to align the slots. Following this the fasteners 22 are installed.

Referring first to FIG. 8, a fastener is shown in position H as it is being passed through the aligned slots 34 of ribs 44. Following this the fastener 22 is moved so that the open end of the U-shaped end 49 contacts the beads 36 of the ribs 44. This is best illustrated in FIG. 9 where the fastener is shown in position I. Following this end 49 is urged over the beads 36 of the ribs 44 so that the U-shaped opening 49 straddles the adjacent ribs as shown in the figures, including FIGS. 10, 11 and 12. The fastener may be driven onto the ribs by a sharp blow from a hammer or like tool. The fastener may be removed with a claw hammer or other tool by prying the end 49 from the rib.

It should be noted that when the fastener 22 when installed contacts the adjacent ribs at three spaced-apart regions, regions X, Y and Z. Regions X and Z are on one rib, while region Y is on the other rib disposed generally between regions X and Z. The fastener exerts forces at regions X, Y and Z such that the adjacent ribs are held together under compression. Unlike prior art fasteners such as the one shown in FIG. 2, the forces holding together adjacent ribs are distributed, and hence provide a more continuous and positive means both from a structural standpoint and from the standpoint of providing a weather-tight seal. The fastener 22 does not include any protrusions which may prevent safety hazards, for example, in this regard see FIG. 11 (note that the free end of end 49 is close to flange 35). Fastener 22 is not dependent for its strength on close dimensional tolerances at wear point as is the fastener of FIG. 2. Thus even if wear occurs within slots 34 such wear will not affect the fastening strength of fastener 22. The fastener relies on the elasticity of the metal defining the fastener, and is stressed well below the metal's fatigue level.

A gasket 30 which in the presently preferred embodiment comprises a resilient material, is disposed within the channel 42 of adjacent ribs 44 (FIG. 12). The gasket has a tacky or glue-like surface in order that the gasket remains within the channel 42 during installation. As the fastener 22 is installed, the gasket is compressed by approximately 50 percent of its nominal thickness thereby providing a weather-tight seal between panels. This seal is particularly resistant to wind, dust, etc. Furthermore, it allows the structure to be insulated and heated since the drafts associated with prior art panels such as those shown in U.S. Pat. No. 3,555,754, are eliminated. Where a water-tight seal is required, such as on a roof, a water-proof tape 28 (shown in FIGS. 3 and 11), or other means such as caulking, is placed over the seam formed by the adjacent flanges 35. This tape, in the presently preferred embodiment, extends over the lips 38 onto the skin 26 as best seen in FIG. 11. Such tape has been found to provide a water-tight structure and is suitable for use on roofs such as the roof 27 of FIG. 1.

In FIG. 13 a thin support strap is shown which allows abutting ribs 24 to be secured to other structures with a fastener engaging slot 34 of the strap. An off-set 58 permits the strap to rest flush against a rib (without interference from a bead 36). Through aperture 63 the strap may be fastened to other structure with nails, bolts, or the like. The strap is thin so as to allow the strap to be used with the fastener 22.

Thus, a utility building system has been disclosed which employs a plurality of modular panels. The panels are fastened together by an easily installed fastener which is easily and inexpensively fabricated and which does not wear as do prior art fasteners. The fastener does not rely upon close tolerances to achieve its strength. The entire system may be readily re-used in different shaped enclosures.

We claim:

1. a fastener for securing a first member to a second member wherein said first and second members each include apertures, said apertures of said first and second members being in alignment comprising:
   a first end for engaging a surface of said first member;
   a generally elongated center section for engaging a surface of said second member, said center section being coupled to said first end so as to permit said fastener to pass through said aligned apertures, said first end and elongated center section lying in substantially the same plane; and,
   a second end extending from said center section opposite said first end, said second end for engaging at least one of said first and second members such that said fastener remains in position;
   whereby said first end of said fastener may be inserted through said aligned apertures and then positioned such that said first end engages a first member and said center section engages said second member and whereby the second end retains said first end and center section in place.

2. The fastener defined by claim 1 wherein said second end is generally U-shaped.

3. The fastener defined by claim 2 wherein said first end is curved such that only a portion of said first end contacts said surface of said first member.

4. The fastener defined by claim 3 wherein said center section is curved such that only a portion of said section engages said surface of said second member.

5. The fastener defined by claim 4 wherein the free end of said U-shaped second end is curved such that said second end engages said surface of said first member.

6. The fastener defined by claim 5 wherein said fastener is defined by a continuous metal rod.

7. In an enclosure system employing a plurality of panels wherein said panels include frames having ribs extending generally transverse to the plane of the panels, and wherein said ribs include apertures, such that when said panels are abutted to form an enclosure apertures of abutting ribs are in alignment, a fastener for securing one rib to an abutting rib comprising:
   an elongated irregularly shaped metal rod defining:
   a. a first end for engaging said one rib;
   b. an elongated center section for engaging said abutting rib, said center section being generally parallel to said first end and offset from said first end; and c. a second end extending from said center section, said second end defining a U-shaped end and lying in a plane generally transverse to the plane of said first and second ends;

whereby said first end of said fastener may be passed through said aligned apertures and driven into place on said ribs such that said first end engages said one rib, said center section engages said abutting rib and said U-shaped end straddles said ribs so as to secure said fastener in place.

* * * * *